US 6,598,522 B2

(12) United States Patent
Yamaguchi

(10) Patent No.: US 6,598,522 B2
(45) Date of Patent: Jul. 29, 2003

(54) EMPTY-CONTAINER PRESSING MACHINE

(75) Inventor: Masao Yamaguchi, Kiryu (JP)

(73) Assignee: Toyoda Products Co., Ltd. (JP)

( * ) Notice: Subject to any disclaimer, the term of this patent is extended or adjusted under 35 U.S.C. 154(b) by 0 days.

(21) Appl. No.: 09/981,235

(22) Filed: Oct. 17, 2001

(65) Prior Publication Data

US 2002/0023552 A1 Feb. 28, 2002

Related U.S. Application Data

(63) Continuation of application No. PCT/JP01/01124, filed on Feb. 16, 2001.

(30) Foreign Application Priority Data

Feb. 18, 2000 (JP) ........................................ 2000-041541

(51) Int. Cl.[7] ................................................. B30B 7/04
(52) U.S. Cl. ........................................ 100/902; 100/42
(58) Field of Search .............................. 100/902, 245, 100/266, 269.13, 137, 240, 233, 229 R, 42, 232; 241/99

(56) References Cited

U.S. PATENT DOCUMENTS 3,934,498 A * 1/1976 Hochanadel ................. 100/35
4,475,449 A * 10/1984 Gianelo ...................... 100/42
6,076,455 A * 6/2000 Geise ....................... 100/258 A

FOREIGN PATENT DOCUMENTS

| JP | 6127602 | * | 5/1994 |
| JP | 6-238494 | | 8/1994 |
| JP | 8-300192 | | 11/1996 |
| JP | 10-180491 | | 7/1998 |
| JP | 11794 | * | 1/1999 |

* cited by examiner

Primary Examiner—Allen Ostrager
Assistant Examiner—Shelley Self
(74) Attorney, Agent, or Firm—Harness, Dickey & Pierce, P.L.C.

(57) ABSTRACT

An empty-container pressing machine comprises a pedestal including a container bearing portion capable of carrying thereon an empty container in an upright posture, a pair of guide posts provided outside the container bearing portion, a container presser vertically movable along the guide posts, and a buckling mechanism for buckling the body of the empty container. The container presser has a function to press and crush the empty container on the container bearing portion from above. The buckling mechanism has a function to buckle or deform the body of the empty container by pressing the sidewall of the body of the empty container before the empty container is crushed by means of the container presser.

4 Claims, 6 Drawing Sheets

EMPTY-CONTAINER PRESSING MACHINE

CROSS-REFERENCE TO RELATED APPLICATIONS

This is a Continuation Application PCT Application No. PCT/JP01/01124, filed Feb. 16, 2001, which was not published under PCT Article 21(2) in English.

This application is based upon and claims the benefit of priority from the prior Japanese Patent Application No. 2000-041541, filed Feb. 18, 2000, the entire contents of which are incorporated herein by reference.

BACKGROUND OF THE INVENTION

1. Field of the Invention

Conventionally, an empty-container pressing machine has been known that can crush empty containers, such as empty metallic cans, plastic bottles, etc., into small forms by means of footing force. Since the conventional empty-container pressing machine is designed simply to crush an empty container by means of foot power from above, it cannot easily crush steel cans that are relatively difficult to be deformed. Further, the conventional empty-container pressing machine has a problem that it requires a strong footing force even in crushing empty containers such as aluminum cans that can be deformed relatively easily.

2. Description of the Related Art

Accordingly, the object of the present invention is to provide an empty-container pressing machine capable of easily crushing even empty containers such as steel cans that are not readily deformable and of crushing aluminum cans and plastic bottles with a lighter force than in the conventional case.

BRIEF SUMMARY OF THE INVENTION

In order to achieve the above object, an empty-container pressing machine according to the present invention comprises: a pedestal including a container bearing portion capable of carrying thereon an empty container in an upright posture; guide posts set up outside the container bearing portion; a foot-operated container presser vertically movable along the guide posts and capable of pressing and crushing the empty container on the container bearing portion from above; and a buckling mechanism for pressing the sidewall of the body of the empty container, thereby buckling the body of the empty container, before the empty container is crushed by means of the container presser.

The empty-container pressing machine of the present invention can easily crush even steel cans that are not readily deformable, and can easily crush aluminum cans and plastic bottles with a lighter force than a conventional empty-container pressing machine can.

Preferably, in this invention, the container bearing portion includes a recess having a bottom capable of supporting an empty can or bottle, the lower surface of the container presser is formed having a protrusion capable of holding the empty container in conjunction with the bottom of the recess, and the container presser is formed having a bottle mouth socket in which the mouth portion of the bottle can be inserted and an air vent through which air in the bottle can be discharged. According to this invention, there may be provided a high-versatility empty-container pressing machine that can crush empty cans, bottles, etc. of various types.

Preferably, in this invention, the bottle mouth socket of the container presser has a size large enough to allow a cap to be fitted onto the mouth portion of the bottle inserted in the bottle mouth socket, and the inner surface of the air vent is shaped so as to spread upward so that the cap can be screwed onto the mouth portion. According to this invention, the cap can be screwed onto the mouth portion of a plastic bottle such as a PET bottle with the bottle crushed in the axial direction, so that air can be prevented from getting into the bottle. Thus, the bottle can be prevented from restoring to its original size by means of its elastic restoring force, and can be kept in a crushed state.

Preferably, in this invention, the guide posts include a pair of upright pipes provided individually on the opposite sides, left and right, of the container bearing portion and formed individually having vertically extending slots in the respective opposite portions thereof, the upright pipes supporting the container presser for vertical movement; the buckling mechanism includes an operating member inserted in the upright pipes for vertical movement and urged upward by means of springs, and a pair of crank elements, upper and lower, adapted to be stored in the upright pipes when the operating member is raised and to project through the respective slots of the upright pipes toward the sidewall of the empty container when the operating member is lowered; and the operating member includes a grip portion capable of enabling an operation to step on the container presser and an operation to pull up the operating member with hands to be simultaneously carried out with one foot of a user on the container presser.

Preferably, in this invention, moreover, each of the upright pipes has a crankcase fixed therein, the crankcase having an opening vertically extending in a position corresponding to each of the slots and a guide hole extending along the opening, the lower end portion of the lower crank element is pivotally mounted on the crankcase by means of a pin in a position lower than the lower end portion of the guide hole, the upper end portion of the upper crank element is pivotally supported on the lower end portion of the operating member by means of a movable pin slidably in engagement with the guide hole, and the upper and lower crank elements may be coupled to each other for extension and contraction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
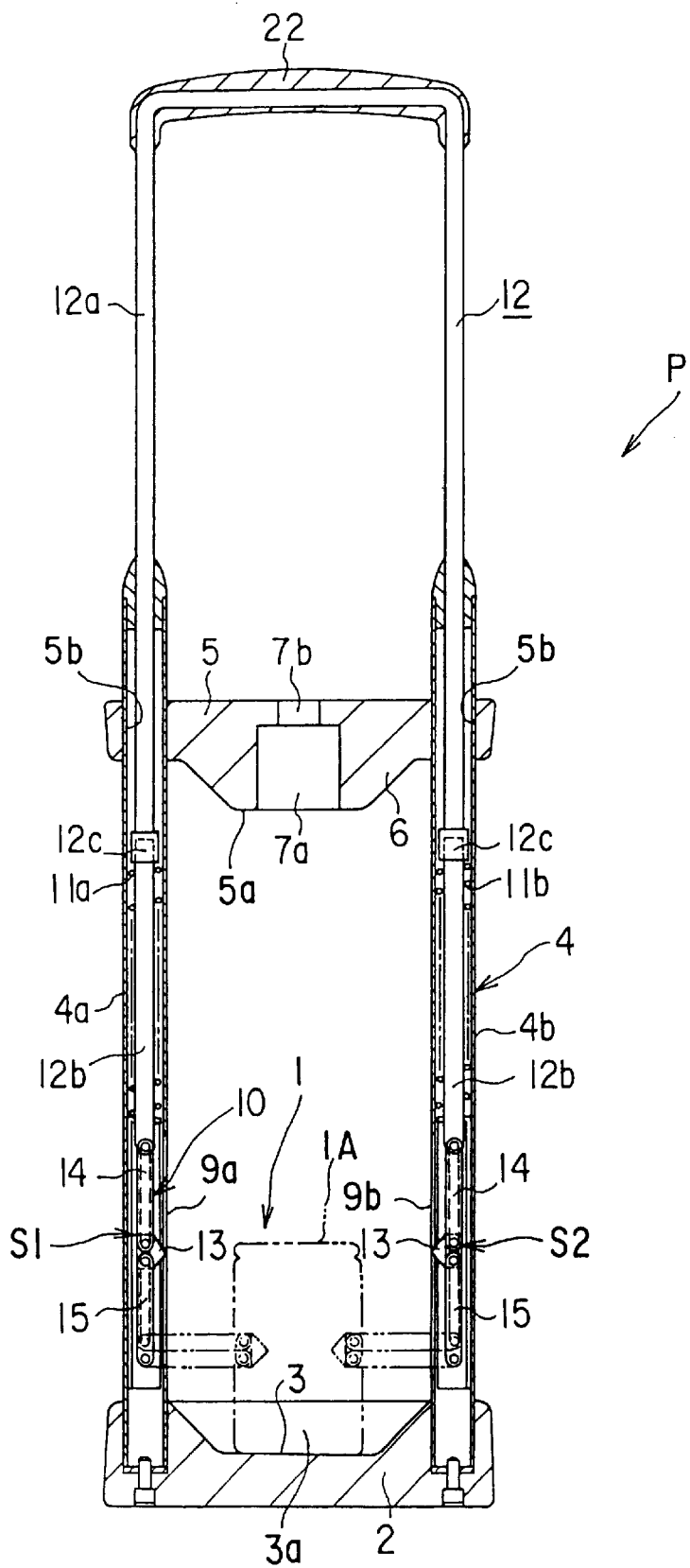
FIG. 1 is a longitudinal sectional view of an empty-container pressing machine according to a first embodiment of the present invention.
Figure 2:
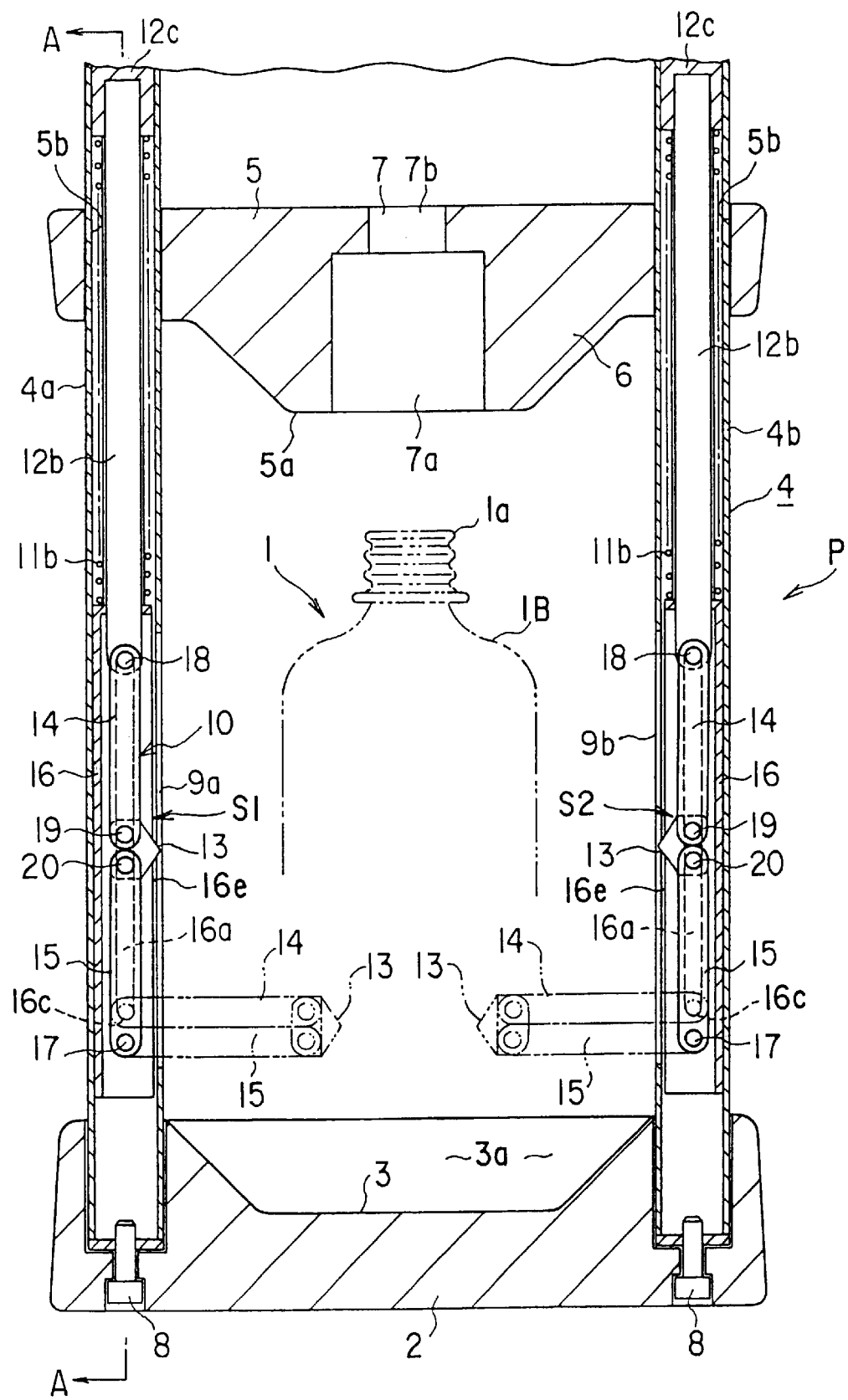
FIG. 2 is an enlarged sectional view of part of the empty-container pressing machine shown in FIG. 1.
Figure 3:
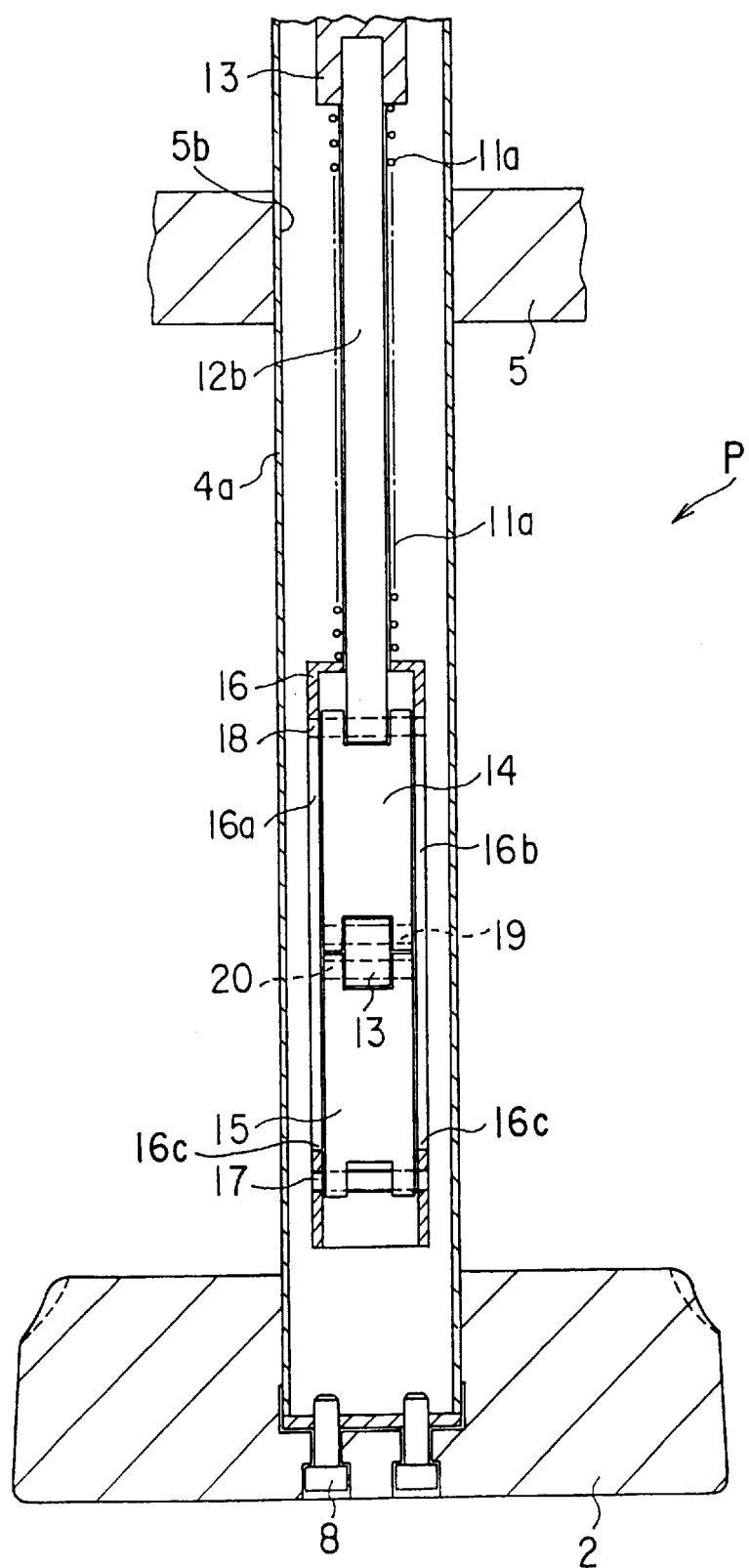
FIG. 3 is a sectional view of the empty-container pressing machine taken along line A—A of FIG. 2.

A first embodiment of the present invention will now be described with reference to FIGS. 1 to 4C. An empty-container pressing machine P of this embodiment is used to crush an empty container 1 into a small form by means of footing force. The empty container 1 may be a deformable metallic empty can 1A (shown in FIG. 1), a plastic bottle 1B (shown in FIG. 2) such as a PET bottle, etc. The empty-container pressing machine P is provided with a pedestal 2. The pedestal 2 includes a container bearing portion 3 on which the empty container 1 is put in a substantially vertical posture. A pair of vertically extending guide posts 4 are provided individually on the opposite sides, left and right, of the container bearing portion 3. These guide posts 4 are provided with a foot-operated container presser 5.

The container presser 5 is vertically movable along the guide posts 4. The container presser 5 is located over the empty container 1 that is placed on the container bearing portion 3, and can compress the empty container 1 in its axial direction. The guide posts 4 are provided with a buckling mechanism 10 for buckling the body of the empty container 1. The buckling mechanism 10, which will be described below, has a function to press the sidewall of the body of the empty container 1 before the container presser 5 crushes the empty container 1.

The container bearing portion 3 includes a recess 3a that opens on the top side. The bottom of the recess 3a has a size such that it can carry empty containers 1 of various dimensions therein. Formed on the lower surface side of the container presser 5 is a container pressing portion 6 having a protrusion 5a that can hold the empty container 1 between itself and the bottom of the recess 3a. A bottle mouth socket 7a into which a mouth portion 1a of the plastic bottle 1B (shown in FIG. 2) as an example of the empty container 1 can get and an air vent 7b through which air in the bottle 1B is to be discharged are formed in the center of the protrusion 5a. The bottle mouth socket 7a and the air vent 7b constitute a communication hole 7.

The guide posts 4 are not specially limited in number. In the case of the present embodiment, the two guide posts 4 are provided individually on the opposite sides, left and right, of the container bearing portion 3. The guide posts 4 are provided with upright pipes 4a and 4b, individually. These upright pipes 4a and 4b are fixed to the pedestal 2 by means of screws 8. The respective cross-sectional shapes of the upright pipes 4a and 4b have are elliptic, for example. Vertical slots 9a and 9b are formed individually on the respective opposite regions of the upright pipes 4a and 4b. These upright pipes 4a and 4b are passed individually through a pair of through holes 5b that are formed in the container presser 5. The container presser 5 is slidable in the axial direction (vertical direction) of the upright pipes 4a and 4b, and can be caused to stop at a desired vertical position by means of the frictional force against the upright pipes 4a and 4b.

The buckling mechanism 10 includes an operating member 12 having a main rod 12a formed of a gate-shaped metallic pipe and a pair of sub-rods 12b, left and right, a pair of flexible bodies S1 and S2 located under the main body 12a, crush-point members 13 attached individually to the flexible bodies S1 and S2, springs 11a and 11b for urging the operating member 12 to ascend, etc. Each of the flexible bodies S1 and S2 is provided with an upper crank element 14 and a lower crank element 15 that have the same length.

Corresponding in position to the slots 9a and 9b, individually, crankcases 16 are fixed in the upright pipes 4a and 4b, respectively, by welding or screwing. Each crankcase 16 has an opening 16e that extends along the slot 9a or 9b. Vertical guide holes 16a and 16b (shown in FIG. 3) are formed individually on the opposite side portions of each case 16. In a position a little lower than a lower end portion 16c of each of the guide holes 16a and 16b, the lower end portion of the lower crank element 15 is pivotally mounted on the case 16 by means of a pin 17. The upper end portion of the upper crank element 14 is coupled to the lower end portion of the sub-rod 12b by means of a movable pin 18. The movable pin 18 is slidably in engagement with the guide holes 16a and 16b of the crankcase 16. The crank elements 14 and 15 are coupled to each other for extension and contraction by means of pins 19 and 20 attached to the crush-point member 13 that serves also as a joint member.

The crank elements 14 and 15 are inserted in each of the upright pipes 4a and 4b. When the main rod 12a is raised by means of the urging force of the springs 11a and 11b or by the raising force of a user's arms, as shown in FIG. 1, the crank elements 14 and 15 extend in a straight line, whereupon the crank elements 14 and 15 are stored in the upright pipes 4a and 4b. When the operating member 12 is pushed down, on the other hand, the crank elements 14 and 15 bend and project toward the sidewall of the empty container 1 through the slots 9a and 9b, as indicated by the dashed line in FIG. 2. As the crush-point members 13 then project substantially horizontally toward the empty container 1, the body of the empty container 1 is pressed. Instead of using the crush-point members 13, the respective distal end portions of the crank elements 14 and 15 may be coupled directly to each other by means of joint members such as pins or the like.

A handgrip portion 22 is provided on the top portion of the main rod 12a. The sub-rods 12b are connected individually to a pair of lower end portions 12c of the main rod 12a. The respective upper ends of the springs 11a and 11b that are provided around the sub-rods 12b are supported by means of the lower end portion 12c of the main rod 12a. The respective lower ends of the springs 11a and 11b are supported individually by means of the respective upper end portion of the crankcases 16. The springs 11a and 11b are compressed as they are stored in the upright pipes 4a and 4b, respectively, and urge the operating member 12 upward by means of their repulsive force.

The following is a description of the method of using the empty-container pressing machine P constructed in this manner.

Figure 4C:
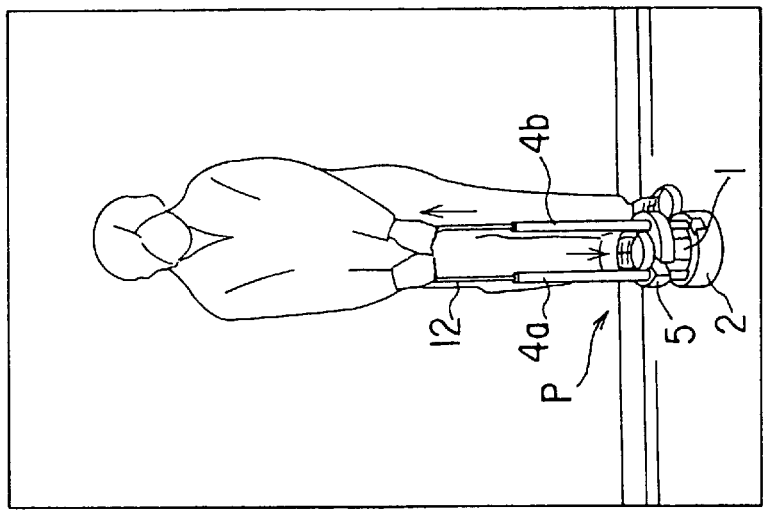
FIG. 4C is a perspective view of the empty-container pressing machine showing a state immediately after the empty container is crushed.
Figure 4B:
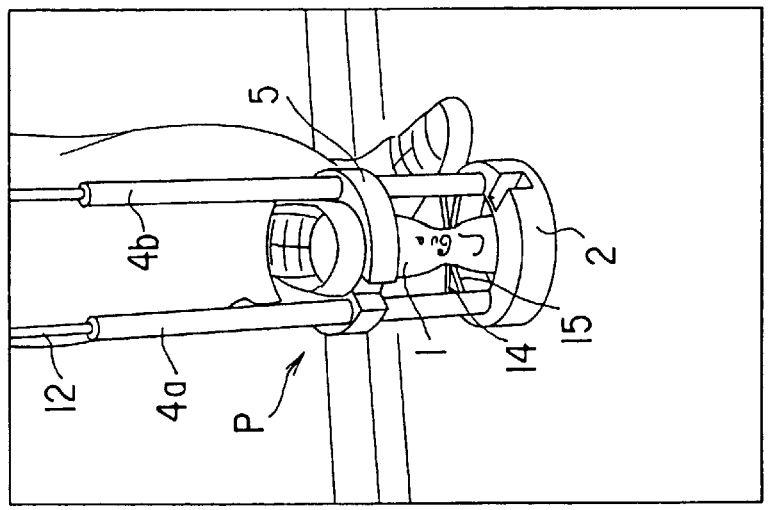
FIG. 4B is an enlarged perspective view of part of the empty-container pressing machine shown in FIG. 4A.
Figure 4A:
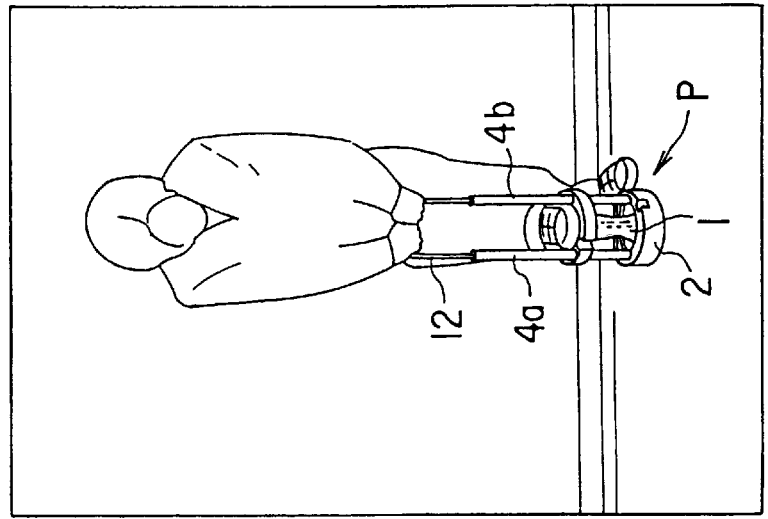
FIG. 4A is a perspective view of the empty-container pressing machine shown in FIG. 1, showing a state before an empty container is crushed by means of the empty-container pressing machine.

An empty container 1 is placed upright on the container bearing portion 3, and the container presser 5 is lowered close to the upper end of the empty container 1. As shown in FIG. 4A, the user pushes down the operating member 12 with both his/her hands, having one foot on the container presser 5. As this is done, the crank elements 14 and 15 bend, and the crush-point members 13 project toward the sidewall of the empty container 1 through the slots 9a and 9b, as indicated by the dashed line in FIG. 2, so that the body of the empty container 1 buckles, as shown in FIG. 4B.

According to this pressing machine P, the body of the empty container 1 is buckled by means of the flexible bodies S1 and S2 before the empty container 1 is crushed by means of the container presser 5, so that the steel can 1A, which is not readily crushable, can be crushed with ease. More specifically, the user can easily crush the empty container 1 by adopting a pressing posture with his/her foot on the container presser 5 and with both hands grasping the operating member 12 and simultaneously carrying out operation to step on the container presser 5 and operation to pull up the operating member 12, as shown in FIG. 4C.

Figure 5:
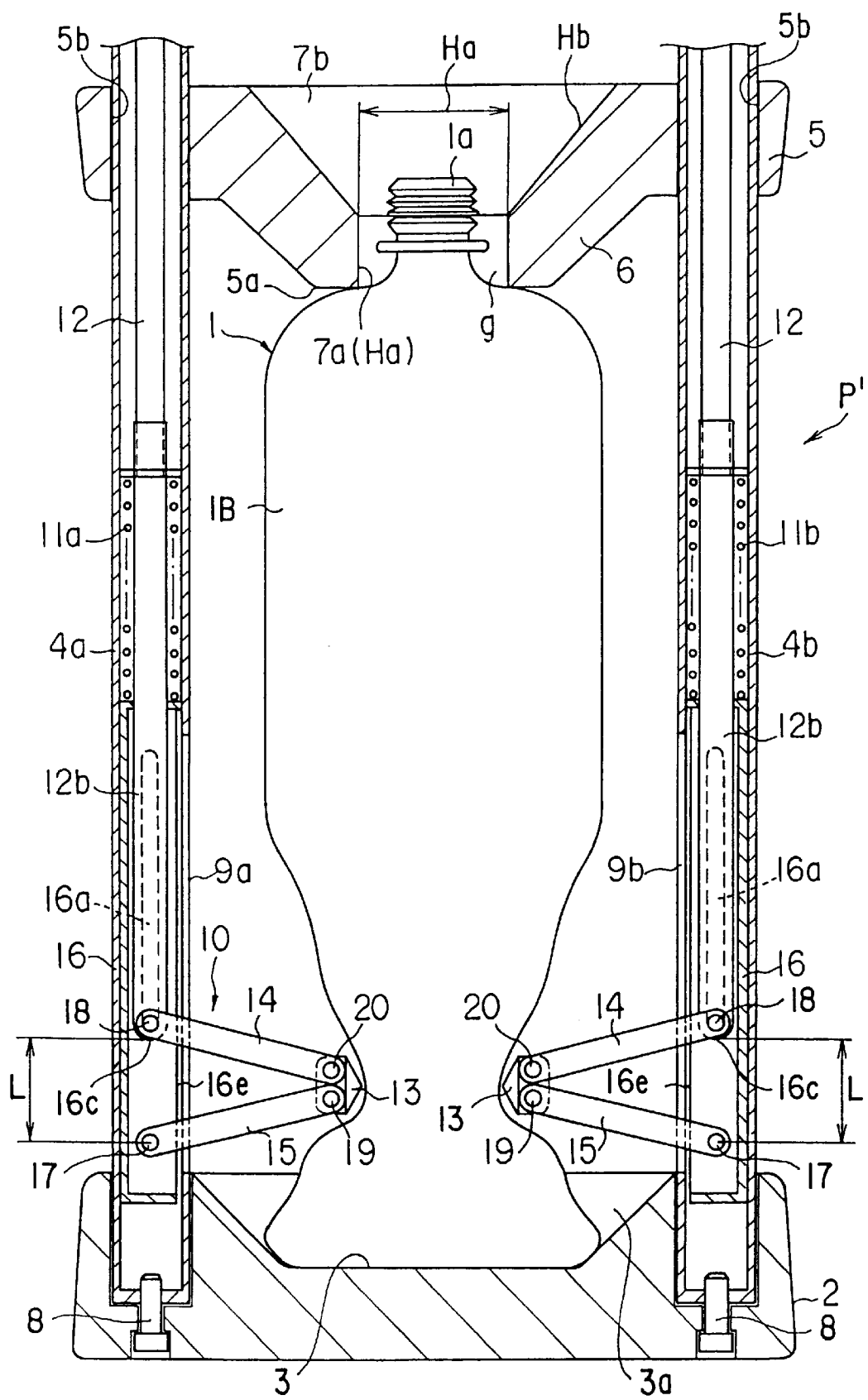
FIG. 5 is a partial longitudinal sectional view of an empty-container pressing machine according to a second embodiment of the present invention.
Figure 6:
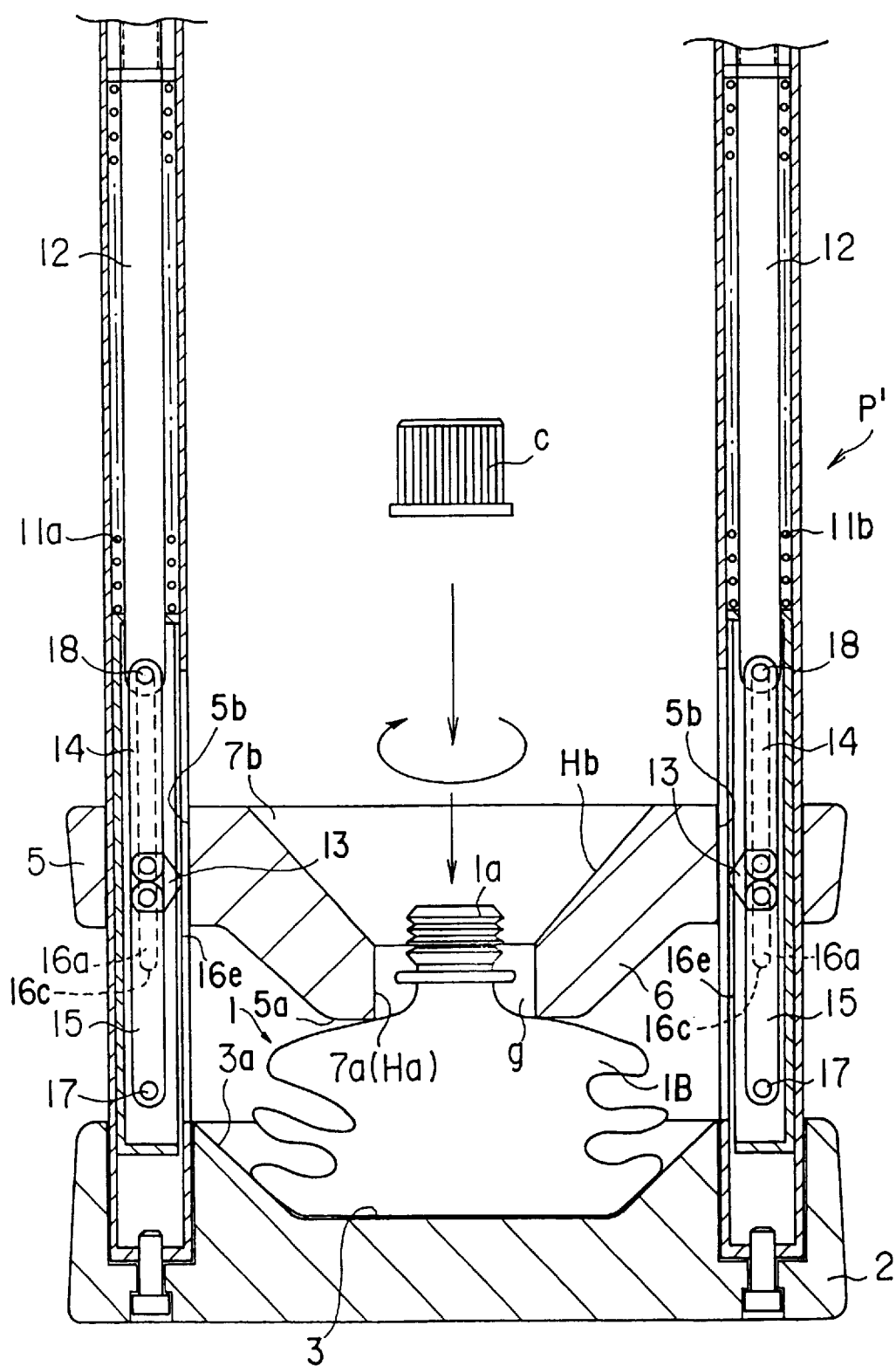
FIG. 6 is a sectional view of the empty-container pressing machine shown in FIG. 5 showing a state in which a container is crushed by means of the empty-container pressing machine shown in FIG. 5.

FIGS. 5 and 6 show an empty-container pressing machine P' according to a second embodiment of the present invention. In this pressing machine P', as shown in FIG. 5, a distance L from a lower end portion 16c of each guide hole 16a or 16b to a pin 17 is longer than in the case of the first embodiment. With this arrangement, crank elements 14 and 15 can project in the shape of fallen V's to deform the sidewall of the body of an empty container 1 when an operating member 12 is lowered. An inside diameter Ha of a bottle mouth socket 7a of a container presser 5 has dimensions such that a gap g wide enough to allow a cap C (shown in FIG. 6) to be fitted onto the mouth portion 1a of the bottle 1B can be made. An inner surface Hb of an air vent 7b has a shape that spreads upward from the upper end of the bottle mouth socket 7a so that the cap C on the mouth portion 1a can be rotated. For other configurations, the second embodiment resembles the foregoing first embodiment, so that like numerals are used to designate those portions which are common to the two embodiments, and a detailed description of those portions is omitted.

Even in the case of the bottle 1B that has the force of elastic restoration of a PET bottle, according to the pressing machine P' of this second embodiment, the cap C can be screwed onto the mouth portion 1a with the bottle deformed (or crushed into a small size), as shown in FIG. 6. By doing this, air can be prevented from getting into the crushed bottle 1B through the mouth portion 1a. Thus, if the bottle 1B, crushed into a small size, is removed from the pressing machine P', it can be prevented from restoring to its original size by means of its elastic force, so that the empty container 1 can be kept in the crushed state.

As is evident from the above description, the present invention is suitably applicable to a foot-operated empty-container pressing machine for crushing empty containers, such as steel cans, aluminum cans, plastic bottles, etc., sizes to be much smaller.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An empty-container pressing machine designed to crush a metallic or plastic empty container by means of footing force, comprising:

a pedestal including a container bearing portion capable of carrying thereon said empty container in an upright posture;

guide posts set up outside said container bearing portion;

a foot-operated container presser vertically movable along said guide posts and capable of pressing and crushing the empty container on said container bearing portion from above; and a buckling mechanism for pressing the sidewall of the body of said empty container, thereby buckling the body of said empty container, before said empty container is crushed by means of said container presser, wherein said guide posts include a pair of upright pipes provided individually on the opposite sides, left and right, of said container bearing portion and formed individually having vertically extending slots in the respective opposite portions thereof, the upright pipes supporting said container presser for vertical movement; said buckling mechanism includes an operating member inserted in said upright pipes for vertical movement and urged upward by means of springs, and a pair of crank elements, upper and lower, adapted to be stored in said upright pipes when the operating member is raised and to project through said respective slots of said upright pipes toward the sidewall of said empty container when said operating member is lowered; and said operating member includes a grip portion capable of enabling operation to step on the container presser and operation to pull up said operating member with hands to be simultaneously carried out with one foot of a user on said container presser.

2. An empty-container pressing machine according to claim 1, wherein said container bearing portion includes a recess having a bottom capable of supporting an empty can or bottle, the lower surface of said container presser is formed having a protrusion capable of holding said empty container in conjunction with the bottom of said recess, and said container presser is formed having a bottle mouth socket in which the mouth portion of the bottle can be inserted and an air vent through which air in the bottle can be discharged.

3. An empty-container pressing machine according to claim 2, wherein said bottle mouth socket of the container presser has a size large enough to allow a cap to be fitted onto the mouth portion of the bottle inserted in the bottle mouth socket, and the inner surface of said air vent is shaped so as to spread upward so that said cap can be screwed onto said mouth portion.

4. An empty-container pressing machine according to claim 1, wherein each said upright pipes has a crankcase fixed therein, the crankcase having an opening vertically extending in a position corresponding to each said slot and a guide hole extending along the opening, the lower end portion of said lower crank element is pivotally mounted on the crankcase by means of a pin in a position lower than the lower end portion of said guide hole, the upper end portion of said upper crank element is pivotally supported on the lower end portion of said operating member by means of a movable pin slidably in engagement with said guide hole, and said upper and lower crank elements are coupled to each other for extension and contraction.

* * * * *